United States Patent
Wagner et al.

[11] 3,895,043
[45] July 15, 1975

[54] SILYL-SUBSTITUTED UREA DERIVATIVES AND A PROCESS FOR THEIR PREPARATION

[75] Inventors: Kuno Wagner, Leverkusen; Günter Oertel, Cologne, both of Germany; Hans Dietrich Gölitz, deceased, late of Cologne, Germany, by Ingrid Irene Klärchen Gölitz, heiress; Bernd Quiring, Leverkusen, Germany

[73] Assignee: Bayer Aktiengesellschaft, Leverkusen, Germany

[22] Filed: Nov. 2, 1972

[21] Appl. No.: 303,192

[30] Foreign Application Priority Data
Nov. 6, 1971  Germany............................ 2155258

[52] U.S. Cl....... 260/448.8 R; 260/79; 260/2.5 AM; 260/448.2 E; 260/448.2 N; 260/46.5 E; 260/46.5 R; 117/135.1; 117/132 BS; 117/124 F; 117/139.5 CQ; 161/206; 161/209
[51] Int. Cl. ............................................... C07f 7/18
[58] Field of Search...260/448.9 R, 448.2 N, 448.2 E, 260/46.5 G, 46.5 R, 46.5 E

[56] References Cited
UNITED STATES PATENTS

| | | | |
|---|---|---|---|
| 3,576,033 | 4/1971 | Tesoro et al. | 260/448.8 R |
| 3,657,303 | 4/1972 | Golitz et al. | 260/448.2 N |
| 3,658,864 | 4/1970 | Golitz et al. | 260/448.2 N |
| 3,676,478 | 7/1972 | Golitz et al. | 260/448.2 N |
| 3,772,351 | 11/1973 | Krahnke | 260/448.2 N |

*Primary Examiner*—Paul F. Shaver
*Attorney, Agent, or Firm*—Joseph C. Gil

[57] ABSTRACT

This invention discloses a silyl-substituted urea derivative of controlled reactivity, high storage stability and which improve the properties of the cross-linked end products obtained by the prior art.

The silyl-substituted urea comprises the general formula:

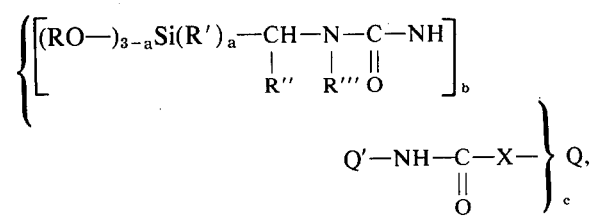

wherein
R represents a $C_1$-$C_{18}$ alkyl, $C_4$-$C_{14}$ cycloalkyl or a phenyl radical,
R' represents a $C_1$-$C_{10}$ alkyl, $C_4$-$C_{10}$ cycloalkyl or $C_6$-$C_{10}$ aryl radical which may be halogenated or cyano-substituted,
R'' represents a hydrogen atom or a methyl or phenyl radical;
R''' represents a hydrogen atom or a $C_1$-$C_{18}$ alkyl, $C_4$-$C_{14}$ cycloalkyl or $C_6$-$C_{14}$ aryl radical which may be halogenated or cyano-substituted;
Q' represents an alkyl radical containing from 4 to 12 carbon atoms with a valency of (b + 1) or a $C_4$-$C_{14}$ cycloalkyl, $C_7$-$C_{15}$ arylalkyl, $C_6$-$C_{14}$ aryl or $C_8$ alkylaryl radical, all of which radicals have a valency of (b + 1);
Q represents a c-valent radical which has been obtained by the removal of C HX groups from a compound with a molecular weight of 200 to 150,000, preferably from 4000 to 80,000, which contains ester, amide, urethane, thioether, acetal, urea, hydrazodicarbonamide, hydrazide and/or carbonate groups and may also contain additional ether groups;
a = 0, 1 or 2;
b = 1 to 7, preferably 1 or 2;
c = 1 to 8, preferably 2 or 3 and
X = O, S, NH or N-Y- (Y = $C_1$-$C_8$ alkyl radicals).

2 Claims, No Drawings

SILYL-SUBSTITUTED UREA DERIVATIVES AND A PROCESS FOR THEIR PREPARATION

The invention also relates to a process for the preparation of silyl-substituted urea derivatives, which consists in reacting an aminoalkyl silane derivative of the formula:

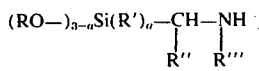

with a compound of the following formula:

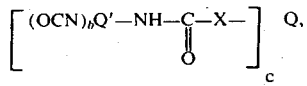

which contains isocyanate groups, which may be in a masked form, at a temperature of between −20°C. and 150°C., preferably in the presence of a solvent.

Silyl-substituted urea derivatives have already been disclosed in U.S. Pat. No. 3,676,478. They are prepared by reacting aminoalkyl silane derivatives with polyethers which contain isocyanate groups. The compounds obtained by this reaction are suitable for use as bonding agents, surface-active agents and as starting materials for the production of organopolysiloxanes. An important feature of these silyl-substituted urea derivatives is that they are synthesized from polyethers which contain only one urethane group for each hydroxyl group of the polyether, i.e., they have an extremely low urethane group concentration and the only urea groups which they contain are silyl-substituted urea end groups. These products, however, are not suitable for the production of high-quality films which can be cross-linked in the cold, light-fast lacquers, fibres, coatings and sheetings which are characterized by a high degree of toughness, strength, hardness, abrasion resistance, tear resistance and elasticity. Although they are highly reactive in the presence of moisture, they are not stable in storage and owing to their poor mechanical properties they are unsuitable for practical use. British Pat. specification No. 1,207,594 describes vulcanizable polymers which are the reaction products of isocyanate terminated polyurethane and/or polyureas with an organosilicone compound having a reactive hydrogen atom. However, the compounds described in this British patent are no aminomethylalkoxysilane derivatives and exhibit for this reasaon a reactivity in application which is clearly inferior to the reactivity of aminomethyl alkoxysilane derivatives, which in fact is at least 1000 times higher than the reactivity of the compounds described in British Pat. No. 1,207,594. Polymer compounds containing aminomethyl alkoxysilane derivatives, which compounds combine high storage stability, high reactivity in application and high level of quality in their end products, have not hitherto been known.

These commercially desirable products are made available by this invention.

It has surprisingly been found that the high reactivity of polyaddition compounds which contain α-aminomethyl-alkoxysilane derivatives, including such polyaddition compounds with a very high molecular weight, can be controlled in various ways which may be utilized commercially, i.e., their reactivity may be increased or reduced depending on the required field of application of the products of the process while their high storage stability is maintained; in addition the properties of the cross-linked end products may be greatly improved compared with those obtainable by the prior art. Trouble-free synthesis of the polyaddition products may be carried out in spite of the extremely high reactivity of the end products in the presence of moisture. According to a particularly advantageous embodiment of the process, this can be achieved by synthesizing those polyaddition products which have a marked tendency to association by virtue of their hydrogen bridge bonds and molecular association and by carrying out the synthesis with previously unknown compounds which have a specifically stabilizing action.

This invention relates to silyl-substituted urea derivatives of the formula:

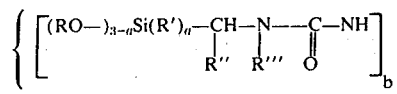

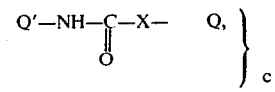

wherein

R represents a $C_1$-$C_{18}$ alkyl, $C_4$-$C_{14}$ cycloalkyl or a phenyl radical, R' represents a $C_1$-$C_{10}$ alkyl, $C_4$-$C_{10}$ cycloalkyl or $C_6$-$C_{10}$ aryl radical which may be halogenated or cyano-substituted, R'' represents a hydrogen atom or a methyl or phenyl radical;

R''' represents a hydrogen atom or a $C_1$-$C_{18}$ alkyl, $C_4$-$C_{14}$ cycloalkyl or $C_6$-$C_{14}$ aryl radical which may be halogenated or cyano-substituted, Q' represents an alkyl radical containing from 4 to 12 carbon atoms with a valency of (b + 1) or a $C_4$-$C_{14}$ cycloalkyl, $C_7$-$C_{15}$ arylalkyl, $C_6$-$C_{14}$ aryl or $C_8$ alkylaryl radical, all of which radicals have a valency of (b + 1);

Q represents a c-valent radical which has been obtained by the removal of c HX groups from a compound with a molecular weight of 200 to 150,000, preferably from 4000 to 80,000, which contains ester, amide, urethane, thioether, acetal, urea, hydrazodicarbonamide, hydrazide and/or carbonate groups and may also contain additional ether groups;

$a$ = 0, 1 or 2;

$b$ = 1 to 7, preferably 1 or 2;

$c$ = 1 to 8, preferably 2 or 3 and

X = O, S, NH or N-Y- (Y = $C_1$-$C_8$ alkyl radicals).

The invention also relates to a process for the preparation of silyl-substituted urea derivatives, which consists in reacting an aminoalkyl silane derivative of the formula:

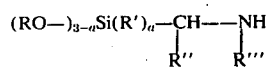

with a compound of the following formula:

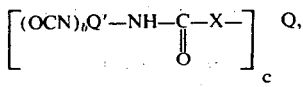

which contains isocyanate groups, which may be in a masked form, at a temperature of between −20°C. and 150°C., preferably in the presence of a solvent.

Starting materials for the preparation of the compounds according to the invention are isocyanate group-containing compounds of the general formula:

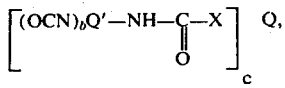

in which Q, Q', X, b and c have the meanings indicated above. These isocyanate group-containing compounds are in turn obtained by reacting polyisocyanates of the general formula:

in which Q' and b have the meanings already indicated, with compounds of the general formula:

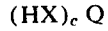

in which Q, X and c have the meanings already indicated, the reaction being carried out in known manner.

The polyisocyanates of the general formula:

may be aliphatic, cycloaliphatic, araliphatic or aromatic polyisocyanates known per se, for example, tetramethylene-1,4-diisocyanate; hexamethylene-1,6-diisocyanate; dodecane-1,12-diisocyanate; cyclohexane-1,3- and -1,4-diisocyanate and any mixtures of these isomers; 1-isocyanato-3,3,5-trimethyl-5-isocyanatomethyl-cyclohexane; phenylene-1,3- and -1,4-diisocyanatotolylene-2,4- and -2,6-diisocyanate and any mixture of these isomers; m-xylylene diisocyanate, hexahydrotolylene-2,4- and -2,6-diisocyanate and any mixtures of these isomers; 4,4'-diisocyanatodicyclohexylmethane; diphenylmethane-4,4'-diisocyanate, naphthylene-1,5-diisocyanate; triphenylmethane-4,4',4''-triisocyanate; polyphenyl-polymethylene polyisocyanates which may be obtained by aniline-formaldehyde condensation followed by phosgenation; polyisocyanates containing carbodiimide isocyanate adducts prepared according to German Patent Specification No. 1,092,007; the diisocyanates described in United States Patent No. 3,492,330; polyisocyanates containing allophanate groups as described in British Patent Specification No. 994,890; Belgian Pat. No. 761,626 and published Dutch Pat. application No. 7,102,524; polyisocyanates containing isocyanurate groups as described in German Patent No. 1,022,789 and 1,027,394 and in German Offenlegungsschrift No. 1,929,034 and 2,004,048; polyisocyanates containing biuret groups as described in German Patent No. 1,101,394; British Pat. Specification NO. 889,050 and French Pat. Specification No. 7,017,514; polyisocyanates prepared by telomerization reactions as described in Belgian Pat. Specification No. 723,640; polyisocyanates containing ester groups as described in British Pat. Specifications No. 956,474 and 1,072,956 as well as the aliphatic, cycloaliphatic, araliphatic or aromatic polyisocyanates mentioned by W. Siefgen in Justus Liebig's Annalen der Chemie, 562, pages 75 to 136; reaction products of the above mentioned isocyanates with acetals according to German Patent No. 1,072,385 and the isocyanates mentioned in German Patent No. 1,022,789 and 1,027,394.

Any mixtures of the above mentioned polyisocyanates may, of course, be used.

It is generally preferred to use commercially readily available polyisocyanates such as tolylene-2,4- and -2,6-diisocyanate and any mixtures of these isomers as well as polyphenyl-polymethylene polyisocyanates which are obtained by aniline-formaldehyde condensation followed by phosgenation.

The following are also preferred: tetramethylene-1,4-diisocyanate, hexamethylene-1,6-diisocyanate, 1-isocyanato-3,3,5-trimethyl-5-isocyanatomethyl-cyclohexane, m-xylylene diisocyanate, 4,4'-diisocyanatodicyclohexylmethane and 4,4'-diisocyanato-diphenylmethane.

The compounds of formula $(HX)_cQ$ used may be any compounds with a molecular weight of 200 to 150,000, preferably 4000 to 80,000, which contain OH-, SH-, $NH_2$-, NH(R) (where R = an alkyl or cycloalkyl radical with up to 18 carbon atoms, a phenyl radical or a hydrogen atom) and ester, amide, thioether, acetal, urethane, urea, hydrazodicarbonamide, hydrazide and/or carbonate groups and may also contain additional ether groups. Compounds of this type which contain amino and/or hydroxyl groups are preferred. Examples of such compounds are: polyesters, polyester amides or polythioethers known per se which contain hydroxyl or amino groups, as well as polyurethanes, polyacetals or polycarbonates within the given molecular weight range which contain e.g., hydroxyl groups. Ester, amide, thioether, acetal, urethane, urea and carbonate groups may, of course, be present side by side in the same molecule of the high molecular weight compound.

These compounds are prepared in known manner, e.g., by reacting polycarboxylic acids with polyalcohols, optionally in the presence of amino alcohols, or by reacting polyalcohols with dialkyl or diaryl carbonates (to polycarbonates) or by reacting thiodiglycol with itself or with other polyalcohols to form polythioethers. Polyurethanes which contain hydroxyl groups, for example, may be obtained by reacting polyesters which contain hydroxyl groups with a sub-equivalent amount of polyisocyanates, to which polyethers which contain hydroxy groups may be added. Known chain-lengthening agents may be added.

The compounds of the formula:

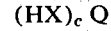

used for the invention are preferably hydroxyl group-containing polyaddition products of polyisocyanates, e.g., of the type already mentioned above, with polyesters which contain at least two hydroxyl groups and have a molecular weight of 400 to 4000, which polyesters may be obtained e.g., by reacting adipic acid or phthalic acid, e.g., with ethylene glycol, butylene glycol, hexane-1,6-diol or neopentyl glycol, or polyaddition products of the aforesaid polyisocyanates with polyethers which have a molecular weight of 400 to 4000 obtainable, e.g., by the polymerization of tetrahydrofuran, or with polythioethers with a molecular weight of 400 to 4000 obtainable, e.g., by autocondensation of thiodiglycol, or with polycarbonates which contain at least two hydroxyl groups and have a molecular weight of 400 to 4000, which polycarbonates may be obtained, e.g., by reacting hexane-1,6-diol with diphenyl carbonate.

The isocyanate group-containing compounds of the general formula:

$$\left[(OCN)_bQ'-NH-\underset{\underset{O}{\|}}{C}-X-\right]_c Q$$

in which Q, Q', X, b and c have the meaninngs already indicated preferably have a molecular weight of from 4000 to 80,000. It is often advantageous to prepare these isocyanate group-containing compounds by starting with compounds of a molecular weight of 400 to 4000 which preferably contain hydroxyl groups, e.g., hydroxyl-containing polyesters, polyacetals, polyethers, polycarbonates or polythioethers of the kind of already described above, and reacting them with polyisocyanates, e.g., of the type mentioned above, at an NCO/H-ratio of 1.5 to 1.01, preferably in the presence of diamines as chain-lengthening agents, e.g., ethylene diamine, trimethylene diamine, hexamethylene-1,6-diamine, 1-amino-3,3,5-trimethyl-5-amino-methyl-cyclohexane, 4,4'-diamino-dicyclohexylmethane, hydrazine, hydrazine hydrate, carbodihydrazide or 4,4'-diamino-diphenylmethane, to produce an isocyanate-containing prepolymer of the above formula without first isolating the compounds of the general formula:

$$(HX)_cQ$$

in which Q, X and c have the meanings already indicated.

The formulae shown below represent examples of aminoalkyl silane derivatives of the formula:

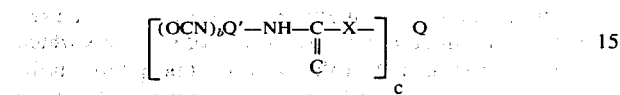

in which R, R', R'', R''' and a have the meanings already indicated, which are suitable for preparing the silyl-substituted urea derivatives according to the invention:

$C_6H_{11}-NH-CH_2-Si(-OC_2H_5)_3$ $C_6H_{11}-NH-CH_2-Si(-O-tert.butyl)_2$

$C_6H_{11}-NH-CH_2-Si(OC_4H_9)_3$

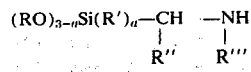

$C_6H_5-CH_2-NH-CH_2-Si(-OC_2H_5)_3$

-Continued

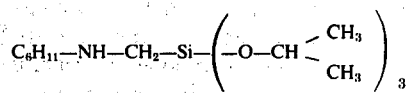

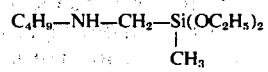

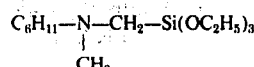

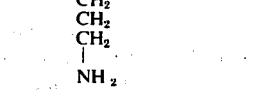

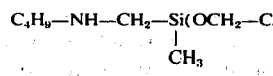

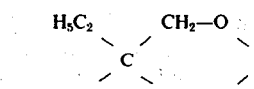

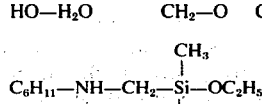

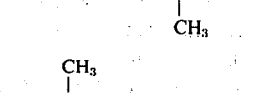

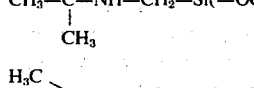

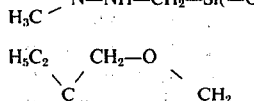

$CH_2-O-CH_2-(CH_2)_2-NH-CH_2-Si(-OC_2H_5)_3$

These aminoalkyl silane derivatives may be prepared by the methods described in German Offenlegungsschriften No. 1,812,564 and 1,812,562. In general, they may be obtained, for example, by reacting amines of the formula R'''-NH$_2$ with, for example, chloromethyltriethoxysilane; bromomethyltriethoxysilane; methyl-chloromethyldiethoxysilane; dimethyl-chloromethyl-ethoxysilane; methyl-bromomethyldiethoxysilane or methyl-bromomethyl-di-n-propoxysilane.

To prepare the compounds according to the invention, an aminoalkyl silane derivative of the formula:

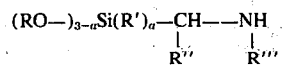

is reacted with an isocyanate-containing compound of the formula:

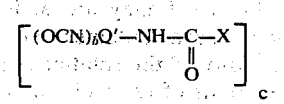

in which R, R', R'', Q, Q', X a, b and c have the meanings already indicated, at a temperature of between −20°C. and 150°C., preferably in the presence of a solvent. The isocyanate compound of the above mentioned formula and the aminoalkyl silane derivative of the above formula are generally used in equivalent amounts so that one isocyanate group is available for reaction with one amino group. If desired, the isocyanate compound of the above mentioned formula used may be in a masked form, i.e., in the form of a reaction product with a group which is easily split off, e.g., a reaction product with phenols, tertiary butanol or imidazole or as a uretdione derivative or a bisulphite addition product. The use of masked isocyanates is known per se.

The reaction between the above mentioned components is generally carried out in the presence of a solvent such as benzene, toluene, cyclohexane, acetone, ethyl acetate, tetralin, dimethylformamide, ethanol, n-propanol or n-butanol. It has surprisingly been observed that the products of the invention can be obtained in a stable form and can be stored if the reaction between the above mentioned aminoalkyl silane derivative of the aforesaid general formula and the isocyanate-containing compounds of the said general formula is carried out in the presence of secondary or tertiary alcohols, halogenated alcohols, araliphatic alcohols such as benzyl alcohol or halogenated hydrocarbons or acylated amides. According to one preferred embodiment of the process according to the invention, therefore, the solvent consists completely or partially of secondary or tertiary alcohols or halogenated hydrocarbons or acylated amides. The secondary or tertiary alcohols or halogenated hydorcarbons or acylated amides may be present in amounts of 0.5 to 97 percent by weight, preferably 10 to 80 percent by weight, based on the total quantity of reactants. It is possible in this way to prevent premature gelling, cross-linking or sedimentation of the reaction products dissolved in the solvent.

Suitable secondary and tertiary alcohols, halogenated alcohols and araliphatic alcohols are, for example, isopropanol, isobutanol, cyclohexanol, tert. amyl alcohol and tert., butanol. Chloroethanol, trichloroethanol, benzyl alcohol, isopropyl alcohol and tert., butanol are preferred. Preferred solvent mixtures are toluene and isopropanol (1:1); toluene and tert. butanol (1:1); xylene, isopropanol and ethanol (1:1:1); toluene, tert. butanol and n-butanol (1:1:1). (Ratios by weight.)

Suitable halogenated hydrocarbons which may be present are e.g., ethylene chloride, chloroform, trichloromonofluoromethane, perchloroethylene and trichloroethylene. Particularly suitable acylated amides are dimethylformamide, methylformamide and dimethylacetamide.

The stabilizing effect of the secondary or tertiary alcohols can be enhanced and at the same time the reactivity of the products in the cross-linking reaction with atmospheric moisture can be greatly increased if small quantities of acid anhydrides and acids or compounds which split off acids are also added. The activating effect of these acid additives can be seen in the evaporation process whereas if they are added to solutions which are kept in closed containers they are capable of keeping the viscosity of the solutions completely constant within the limits of error of measurement over a period of half a year. This combined stabilizing and activating effect in cross-linking reactions is of great practical importance because it not only ensures the long-term stability of solutions kept in vessels which are sealed off from atmospheric moisture but also allows an extremely rapid cross-linking reaction to be carried out at any time, even at temperatures of about −10°C. The new compounds according to the invention, which are highly reactive and extremely readily crosslinked via their siloxane groups, can thereby be converted into producuts which are stable on storage, thereby opening up an extremely wide range of possible applications of these new polymers which can now easily be cross-linked whenever required. The polymers produced in this way take up a position of pre-eminence in the chemistry of cross-linkable high-molecular weight polymers because of their high cross-linking velocity and the quantitative progress of the cross-linking reaction with the formation of stable polysiloxane bonds.

The process according to the invention may be used for the production of a wide variety of polymers which may be cross-linked in the cold by atmospheric moisture or by the moisture contained in organic solvents or in inert gases and, if desired, they may even be cross-linked at temperatures below 0°C. without the use of catalysts or additional crosslinking agents and without heating.

The following compounds are examples of acids, acid anhydrides or compounds which split off acids and which provide an additional stabilizing effect within the meaning of the invention and act as stabilizers in the cross-linking reaction of the products of the invention with atmospheric moisture: Acetic acid anhydride; acetic acid; formic acid; propionic acid; butyric acid; trichloroeacetic acid; p-toluene sulphonic acid esters; dimethylcarbamic acid chloride; benzoyl chloride; N-phenyl-carbamic acid chloride; chloroacetaldehyde; chloral; propionic acid anhydride; mixed anhydrides of lower carboxylic acids; cyclic anhydrides such as maleic acid anhydride; phthalic acid anhydride; tetrahydrophthalic acid anhydride; semi-esters of cyclic acid anhydridies e.g. of 1 mol of phthalic acid anhydride with 1 mol of methanol, butanol or isopropanol; or semi-esters of these cyclic acid anhydides with glycols which contain both a hydroxyl and a carboxyl group in their molecule, e.g. semi-esters of 1 mol of maleic acid anhydride or hexahydrophthalic acid anhydride with 1 mol of glycol, propylene-1,3-glycol or butane-1,4-diol. The addition of small quantities of easily hydrolysable esters such as boric acid esters, diethyl oxalate, ethyl orthoformate, reaction products of p-toluenesulphonyl isocyanate with alcohols or amines or small quantities of p-toluene sulponyl isocyanate or of acyl isocyanates such as benzoyl isocyanate or the addition of hydrochlorides of trimethylamine, triethylamine, etc. may also be advantageous. These stablizers which, in addition have an accelerating effect on the crosslinking process, are preferably added in quantities of 0.2 to 5 percent by weight, based on the solid substance, to solutions of the products of the process in alcohol mixtures or in stabilizing solvents such as chloroform, methylene chloride, perchloroethylene, trichloroethylene, dimethylformamide, dimethylacetamide or formamide.

If the products of the process are synthesized in the absence of stabilizing alcohols for the above mentioned solvents, it is often advantageous to add water-binding agents such as methoxymethyl isocyanate, phenyl isocyanate, p-tolyl-sulphonyl isocyanate, acyl isocyanates, chlorocarbonyl isocyanates or easily saponifiable esters of oxalic acid or of boric acid to the solutions of the product in inert organic solvents such as acetone, methyl ethyl ketone, methyl isopropyl ketone, ethyl acetate, butyl acetate, xylene, toluene, 1,4-dioxane, 1,3-dioxane, cyclohexanone or mixtures of these solvents and subsequently to add the stabilizing alcohols. If desired, aliphatic cycloaliphatic or araliphatic carboxylic acid anhydrides, mixed anhydrides or cyclic anhydrides may be added in larger quantities, e.g., from 10 to 15 percent by weight. In that case, a small quantity of acyloxysilane groups may be formed in the dissolved products of the process by exchange reactions with alkoxy groups or a small quantity of silanol groups may be formed if free carboxylic acids are added.

The usual active or inactive fillers may be added to the products according to the invention, e.g., chalk, talcum, silica, silica gel, quartz powder, titanium dioxide, iron oxides, zirconium silicate, calcium sulphate, aluminium oxide, magnesium carbon black, graphite, sand and the commonly used finely disperse fillers based on silicon dioxide. All of these fillers may either be added in a highly dehydrated state or freed from water by dehydration in the preferred stabilizing alcohols and thier acid additives.

The products according to the invention, especially the products which have been stabilized according to the invention are high-grade coldhardening substances, i.e. they are extremely readily cross-linked by moisture or are masked compounds which split off moisture without heating and can be converted into a wide variety of end products, e.g. elastic or hard cross-linked polymers with a high chemical and temperature resistance. They can be used for the production of highly elastic films and for very light-fast and chemically resistant lacquers and coatings on any support as well as for the production of rubbery elastic products, fibers and sealing compositions of any kind. They may also be used for embedding electrical apparatus, for insulation against heat or cold, for laminating various pigments, for elastically encasing various water-soluble plant nutrient salts and medicaments, as anti-corrosive compounds, for rubberizing metals such as silver, aluminium or copper, as firmly adhering substances free from cross-linking which render substrates hydrophobic as rapidly cross-linking surface active compounds, as laminating and rubberizing agents for fibers and fleeces, as bonding agents for fleeces and as excellent adhesives.

A wide variety of synthetic resin segments may be cross-linked via siloxane bridge in accordance with the invention and combined with each other and in many cases aminoalkyl silane derivatives of the following general formula which has already been mentioned above:

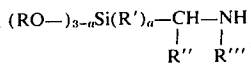

in which R, R', R'', R''' and a have the meanings already indicated are added to the products according to the invention in quantities of 2-60 percent by weight at the cross-linking stage to control their adhesive properties, degree of cross-linking and swelling. The use of products which have been stabilized in accordance with the invention and which become activated when applied enables new and economical techniques to be employed for processes of coating and impregnating and for encasing synthetic or natural fibers or threads in such a way that they are free from tackiness and may therefore be rolled up at high speed. The products according to the invention also allow rapid dipvarnishing and dip-coating for the insulation of cables to be carried out and make possible elegant methods for the production of rapidly reacting cable sheaths for wire lacquering and the application of rapidly crosslinking substances with adhesive properties and good bonding power. Another interesting application is the rapid and non-sticky encasing of moisturecontaining pigments.

The products according to the invention may, if desired, be mixed with organopolysiloxanes which can be cross-linked in known manner, e.g. those which have been prepared by the condensation of chloro- and alkoxy-silanes by cohydrolysis with water or by the polymerization of cyclic organosiloxanes with alkaline or acid catalysts and which are cross-linked e.g. with $\Delta,\omega$-dihydroxypolydimethyl siloxanes. The products of the process are also highly interesting reagents for carrying out the matrix reactions described in Belgian Patent Specification No. 746,982 and for impregnating foams.

The new compounds according to the invention also make possible the production of synthetic resins which may be cross-linked by moisture in the cold, e.g. the production of firmly bonded very light-fast elastic coatings and lacquers on various metals and nobel metals by the simple and rapid method of dip lacquering metal articles such as sheets or shaped metal parts, as well as the production of elastic and abrasion-resistant semi-hard or hard synthetic resin lacquers.

Another important application of the compounds according to the invention is their use in the high-quality finishing of paper, textiles and foams, in particular, polyurethane foams. Particularly elegant forms of application with controlled cross-linking can be achieved by using products of the process stabilized according to the invention which contain alcohols and acid additives. It is particularly advantageous that the activating effect of these acid additives only comes into effect during the evaporation of the alcohol-containing solvent mixtures when the products are being put into use, whereas in sealed containers these acid additives ensure the viscosity of the products remains completely constant. The controlled cross-linking reaction of the compounds according to the invention sets in immediately the alcohol concentration, e.g., in the film, falls while the film is drying in the presence of atmospheric moisture. This controlled cross-linking of the products, i.e., a cross-linking which can set in whenever required, e.g. in the presence of atmospheric moisture, can be accelerated to such an extent by the acid additives that it is completed with a few minutes in the cold. This cross-linking reaction of the compounds according to the invention is accompanied by the formation of polysiloxane bridge members.

The invention is further illustrated but is not intended to be limited by the following examples in which all parts and percentages are by weight unless otherwise specified.

EXAMPLE 1

200 parts by weight (0.1 mol) of a polyester of adipic acid and ethylene glycol (OH number 56) are dehydrated for 30 minutes at 120°C and then reacted at this temperature with 44.4 parts by weight of 1-isocyanato3,3,5-trimethyl-5-isocyanatomethyl-cyclohexane (0.2 mol) to produce the $\alpha,\omega$-diisocyanato prepolymer. The temperature of the NCO-prepolymer is allowed to fall to 100°C. and the prepolymer is then diluted with 100 parts by weight of toluene. The resulting solution is cooled to 30°C. and rapidly diluted with 200 parts by weight of a solvent mixture of toluene and tert. butanol (1:1). A solution of 13 parts by weight of 1-amino-3,3,5-trimethyl5-aminomethyl-cyclohexane (isophorone diamine) in a solvent mixture of 216 parts by weight of anhydrous toluene and 216 parts by weight of anhydrous tert. butanol is then added dropwise to this solution at 20°-24°C. in the course of 20 minutes with rapid stirring. The α, ω -diisocyanatopolyurethane polyurea, which is in solution, is then immediately reacted with N-cyclohexyl-(aminomethyl)-triethoxysilane by adding a solution of 12.9 parts by weight of the said basic silane derivative in 335 parts by weight of a mixture of toluene and tert. butanol (1:1). The water-clear, approximately 20 percent solution of polyester-polyurethane polyurea which has an average molecular weight of about 10,9000 now contains triethoxysilane urea end groups. The solution has a viscosity of 45 cP at 25°C. (sample A).

If the synthesis of sample A is carried out in the absence of tert. butanol as stabilizing agent and solvent, cross-linked products are immediately obtained since even traces of moisture are sufficient to bring about siloxane cross-linking.

Solution (A) is completely free from gel particles and crosslinked polyaddition products. If stored free from moisture, the solution is stable for 30 days at room temperature. After this time the viscosity starts to rise continuously and soon exceeds 40,000 cP ending in complete cross-linking of the polyurethane polyurea. All the viscosity determinations are carried out in unopened sample bottles each one of which is used for only one measurement. All the sample bottles were heated to 110°C. before introduction of sample A and were filled hot and then sealed. The following results are obtained from continuous viscosity measurements: the storage stability of sample (A) is very greatly increased by the addition of 0.5 percent by weight of acetic acid anhydride, the viscosity being found to be practically unchanged at 58 cP, measured at 25°C., even after half a year at 20°– 25°C. (sample B).

If samples A and B are poured onto glass supports, high-quality films of high strength are obtained which are firmly bonded to the glass. In the case of A, the films are quantitatively cross-linked within 10 - 15 minutes at a relative humidity of about 60 percent while the more stable sample B is already completely cross-linked only 5 minutes after film formation. The amount of cross-linked polyurethane polyurea is measured by gravimetric determination of the constituents which are not dissolved in dimethylformamide. This determination is carried out with an accuracy of ±0.5 percent, i.e., it is very accurate since uncross-linked polyurethane polyureas from example A are very rapidly soluble in dimethylformamide at temperatures of only 40°C. over the whole molecular weight range of 40,000 to 200,000.

When used as highly elastic lacquers or also as coatings, crosslinked films of samples A and B have surprisingly high strength and elasticity, excellent abrasion resistance, maximum fastness to light and chemical resistance. This is due to their high urea group concentration and the resulting intermolecular forces.

| | |
|---|---|
| Tensile Strength (DIN 53 504) | 180 kg/cm² |
| Elongation at Break | 450% |
| Permanent Elongation | 8% |
| Shore Hardness A (DIN 53 505) | 45% |
| Elasticity (DIN 53 512) | 46% |

If the quantity of acetic acid anhydride used in this example to produce an extremely high degree of stabilization is replaced by a. 0.3 percent by weight of acetic acid b. 0.4 percent by weight of propionic acid anhydride c. 0.05 percent by weight of dimethylcarbamic acid chloride d. 0.04 percent by weight of formic acid e. 0.03 percent by weight of methyl p-toluene sulphonate the products are found to have high stability in storage when tested over a period of 3 months, the following changes in viscosity at 21°C. being found:

| | | |
|---|---|---|
| (a) | 51 centipoise | 56 centipoise |
| (b) | 51 centipoise | 61 centipoise |
| (c) | 51 centipoise | 63 centipoise |
| (d) | 51 centipoise | 59 centipoise |
| (e) | 51 centipoise | 68 centipoise |

Comparison example relating to Offenlegungsschrift No. 1,812,562

The procedure is exactly the same as in example 1, but in the preparation of the NCO prepolymer 200 parts by weight of an α, ω - dihydroxy propylene glycol polyether with OH-number 56 is reacted with 44.4 parts by weight of 1-isocyanato-3,3,5-trimethyl-5-isocyanatocyclohexane. A polyaddition product which contains no urea groups or ester groups as chain-lengthening segments and contains only one chain linking urethane group per hydroxyl group of the polyether and only two highly reactive ethoxy-silane-urea end groups is then prepared in accordance with Offenlegungsschrift No. 1,812,562 by adding 55.5 parts by weight of N-cyclohexyl-(aminomethyl)-triethoxysilane. Average molecular weight of polyaddition production = 2,999. Cross-linked films produced from this compound under the conditions described in example 1 have the following properties which are commercially of no interest for the production of fibres, coatings or lacquers:

| | |
|---|---|
| Tensile Strength (DIN 53 504) | 20 kg/cm² |
| Elongation at Break | 90% |
| High Tackiness and Low Chemical Resistance | |

After 14 days ageing in daylight, the tensile strength has dropped to 5 kg/cm². Compared with these products, the products according to the invention are improved in strength and elongation at break by about 900 - 500 percent.

Cross-linking of the film progresses very slowly and after 8 hours the film is still highly tacky, in contrast to the results obtained in example 1, and at that time it still contains 35 percent by weight of constituents which are readily soluble in dimethylformamide at room temperature (see, for comparison, example 1 and example 2).

EXAMPLE 2

The procedure is exactly the same as in example 1 but the α, ω - dihydroxyl compound used is the polypropylene glycol polyether of the comparison example.

A water-clear solution which contains about 20 percent by weight of a polyether-polyurethane polyurea with an average molecular weight of 10,900 is obtained. When films are cast from this solution onto glass or metal sheet supports, they are quantitatively cross-linked within 10 minutes under the conditions of example 1 whereas cross-linking of the polyether polyurethane in example 2 takes 48 times as long and is then still not completed. This example shows the surprising result that the higher concentrations of urea groups are of considerable advantage for the quantitative cross-linking reaction (= polysiloxane cross-linking). Highgloss films which are completely free from tackiness and have excellent properties compared with those of the comparison example are obtained.

| | |
|---|---|
| Tensile Strength (DIN 53 504) | 168 kg/cm$^2$ |
| Elongation at Break | 320% |
| Permanent Elongation | 9% |
| Shore A-Hardness (DIN 53 505) | 38% |
| Proportion of Uncross-Linked Compound | 1.5% |

EXAMPLE 3

The procedure is the same as in Example 1 but using equivalent quantities of other diisocyanates, namely:
a. 33.6 parts by weight of hexamethylene diisocyanate
b. 37.6 parts by weight of m-xylylene diisocyanate
c. 42.0 parts by weight of trimethyl hexamethylene diisocyanate
d. a mixture of 16.8 parts by weight of hexamethylene diisocyanate and 22.2 parts by weight of 1-isocyanato-3,3,5-trimethyl-5-isocyanatomethyl-cyclohexane
e. 58 parts by weight of an isocyanate telomer of hexamethylene diisocyanate and vinyl acetate prepared according to German Patent Application LeA 11,106 which contains 40 percent by weight of grafted polyvinyl acetate and is dissolved in excess hexamethylene diisocyanate. NCO-content of the solution = 29%, hexamethylene diisocyanate content = 58% by weight.
f. 52.4 parts by weight of 4,4'-diisocyanato-dicyclohexylmethane
g. 25 parts by weight of 4,4'-diisocyanato-diphenylmethane and 22.4 parts of 1-isocyanato-3,3,5-trimethyl-5-isocyanatomethyl cyclohexane
h. 17.4 parts by weight of 1-methyl benzene-2,4-diisocyanate and 22.4 parts by weight of 1-isocyanato-3,3,5-trimethyl-5-isocyanatocyclohexane.

Polyurea formation and introduction of the reactive ethoxysilane end groups are carried out as in example 1. The products obtained are 20% by weight solutions of highly reactive polyester-polyurethane polyureas which are stable in storage and can be cross-linked by atmospheric moisture in the cold. When made up into films, they have tensile strengths of 190-210 kg/cm$^2$ and attain the following viscosities at 25°C.:

| | | | |
|---|---|---|---|
| (a) | 2,200 cP | (e) | 1,900 cP |
| (b) | 3,300 cP | (f) | 3,200 cP |
| (c) | 1,100 cP | (g) | 4,900 cP |
| (d) | 1,900 cP | (h) | 3,850 cP |

When 20 percent solutions of these polyurethane-polyureas prepared according to (a) - (f) are cast onto supports of wood, sheet metal, textiles, leather or synthetic resins, soft, cross-linked and highly elastic films with high abrasion resistance and high folding strength and extremely high fastness to light are obtained, which can be used, for example, for the production of highly elastic lacquers and coatings.

EXAMPLE 4

The procedure is exactly the same as in example 1 but the polyester used in that example is replaced by:
a. Polyester of adipic acid and butane-1,4-diol, OH-number 51
b. polyester of adipic acid and hexanediol and neopentyl glycol (molar ratio 30:22:12), OH-number 58
c. polythioether of thiodiglycol and triethylene glycol (70:30), OH-number 53
d. polybutylene glycol polyether, OH-number 49.

The chain-lengthening agent used for the α, ω-diisocyanato prepolymers obtained with polyesters (a) to (d) is in each case 15.5 parts by weight of 1-amino-3,3,5-trimethyl-5-amiinomethyl-cyclohexane, α, ω-diisocyanato polyester-polyurethane-polyureas or polyether- or polythioether-polyurethane-polyureas with an average molecular weight of about 22,000 being obtained, which are then immediately reacted at their end groups with 4.7 parts by weight of N-cyclohexyl-(aminomethyl)-triethoxysilane in accordance with example 1. The solution is then stabilized by the addition of 4 parts by weight of acetic acid anhydride. 20 percent by weight solutions which are highly reactive and storage stable are obtained. These solutions are quantitatively cross-linked at room temperature within 10 min. at 50-60 percent relative humidity to give rise to highly elastic films with high tensile strengths. The solutions are storage stable and have the following viscosities at 25°C:

a. 22,500 cP b. 18,900 cP c. 33,200 cP d. 18,900 cP

Equally good polyaddition products which moreover have excellent fastness to light and resistance to oxidation are obtained if hydrazine, hydrazine hydrate, 4,4'-diamino-dicyclohexyl methane, hexamethylene diamine, propylene-1,2-diamine, m-xylylene diamine or a lysine methyl ester is used as chain-lengthening agent is this example. If the quantity of the aforesaid silicon-monomers is increased to 0.048 to 0.15 mol, mixtures which are storage stable are obtained in which the unbound silicon monomers take over the function of chain-lengthening or cross-linking agents and the silicon content of the cross-linked end products can be greatly increased, whereby the bond strength on glass or ceramic supports is greatly increased.

EXAMPLE 5

This example shows that without the formation of difficulty soluble polyureas, it is possible to prepare the cross-linkable products of the process with even higher urea group concentrations than in example 1, polyurea blocks being built into the polyaddition products. The hardness of the cross-linked end products is thereby greatly increased.

a. The procedure is exactly the same as that described in example 1 but in addition 22.2 parts by weight of monomeric 1-isocyanato-3,3,5-trimethyl-5-isocyanatomethyl-cyclohexane are added to the resulting NCO prepolymer. α, ω-diisocyanato polyurea is produced by the addition of 28 parts by weight of 1-amino-3,3,5-trimethyl-5-aminomethyl-cyclohexane ($NCO/NH_2$ equivalent ratio = 1.21). 19.25 parts by weight of N-cyclohexyl(aminomethyl)-triethoxysilane are added to react with the end groups of the α, ω-diisocyanato-polyurea and 3.15 parts by weight of the above ethoxysilane are then added in excess. This excess ethoxysilane is built in as chain cross-linking agent during the subsequent cross-linking reaction with atmospheric moisture. The resulting solution is stabilized by the addition of 5 parts by weight of acetic acid anhydride and the monomeric, basic ethoxysilane derivative is converted into

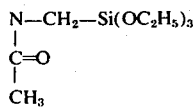

The viscosity of the 20 percent solution after 5 months storage at 25°C. = 46 cP.

b. The procedure is the same as that described under (a) but the quantity of monomeric diisocyanate is increased to 44.4 parts by weight. In addition, the quantity of diamine used as chain-lengthening agent is increased to 43.7 parts by weight. The $NCO/NH_2$ equivalent ratio = 1.17. The subsequent reaction of the NCO end groups is carried out with 23.6 parts by weight of N-cyclohexyl-(aminomethyl)-triethoxysilane. The resulting solution is stabilized with 5 parts by weight of acetic acid anhydride. The viscosity of the approximately 20% solution at 21°C. = 517 cP.

c. The procedure is the same as that described under (a) but the solvent mixture of toluene and tert. butanol is replaced by dimethylformamide which is equally stabilizing and the aromatic diisocyanate used is 75 parts by weight of 4,4'-diisocyanato-diphenylmethane. Viscosity = 250 cP at 21°C.

The products obtained in cases (a) to (c) are all highly reactive, stabilized and water-clear solutions of polyester-polyurethane-polyureas with a high urea group concentration which have excellent film-forming and fibre-forming properties. Quantitative cross-linking occurs in 1–2 minutes at 65 percent atmosphereic moisture.

a Shore Hardness A (DIN 53 505) : 65
b Shore Hardness B (DIN 53 505) : 45
c Shore Hardness A (DIN 53 505) : 55

EXAMPLE 5a

This example shows that the procedure described in example 5b can be modified to produce end products in the form of stable powders or pastes. The procedure is exactly that described in example 5 but after preparation of the polyaddition product, 2000 parts by weight of anhydrous tert. butanol are gradually added with vigorous stirring using a high-speed stirrer. The solution soon becomes cloudy and the polyaddition products are obtained in the form of powders. The pulverulent polyaddition products are filtered through a pressure and suction filter with the exclusion of moisture and stored moist with tert. butanol. When the powders are melted in air (60 percent relative humidity), films which are immediately cross-linked at 185°C. are obtained.

EXAMPLE 6

This example shows that it is possible to use the products of the process for carrying out matrix reactions described in Belgian Pat. Specification No. 746,982. Small quantities of moisture present in open-celled polyurethane foams, for example, are sufficient to effect rapid cross-linking of the products of the process so that they become arranged in an open-celled, cross-linked form in the new spaces produced by the swelling pressure. The experiment is carried out with the polyurethanepolyurea of example 1 of Belgian Patent Specification No. 769,002. A polyurethane foam block produced according to example 1 of Belgian Patent Specification No. 769,002 and measuring 30 cm × 15 cm × 5 cm (2250 cm³) (= 83.3 parts by weight) is soaked in 500 parts by weight of the polyurethane solution prepared according to example 1, pressed out, again soaked and then only lightly stripped to remove solution not adhering to it, a total of about 480 parts by weight of the solution being absorbed in the foam. This pretreated foam is dried under vacuum at a room temperature of 70°C. A high-grade, completely non-sticky, soft, open-celled and highly elastic foam is obtained (160 parts by weight), which has a unit weight of about 76 kg/m³ and which has increased its weight compared with that of the starting material by about 100 percent by weight and yet has remained completely open-celled and non-sticky. This elastic foam which has been modified by cross-linked polyurethane-polyureas undergoes no color change even when stored in light for several months and is pure white, whereas the untreated foam undergoes yellowing in the course of only 10 days in sunlight and assumes a brownish yellow color.

EXAMPLE 7

The following 30 percent solutions of high molecular weight polyisocyanates in toluene are reacted with N-cyclohexyl-(aminomethyl)-triethoxysilane:

a. 60 parts by weight of a copolymer of 60% of styrene, 34% of butyl acrylate and 6% of β-isocyanatoethyl methacrylate (1.5% NCO) with 12 parts by weight of N-cyclohexyl-(aminomethyl)-triethoxysilane.

b. 100 parts by weight of an NCO telomer prepared by the method described in German Offenlegungsschrift No. 1,720,747 which telomer contains the following polyisocyanate as graft basis:

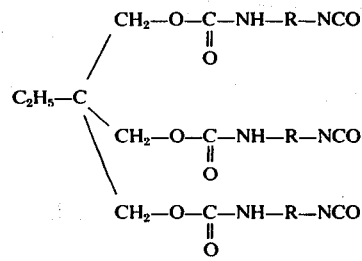

in which R represents

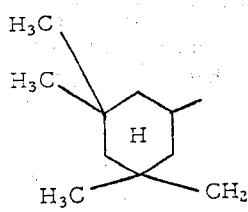

and 30% by weight of grafted polystyrene segments (% NCO = 18.5%) with 90 parts by weight of N-cyclohexyl-(aminomethyl)-triethoxysilane. c. 260 parts by weight of an α, ω-diisocyanato prepolymer of hexamethylene diisocyanate and propylene glycol polyether with an average molecular weight of 2500 which has been grafted with vinyl acetate and contains 40% by weight of polyvinyl acetate segments (% NCO = 1.2) with 9 parts by weight of N-cyclohexyl-(aminomethyl)-triethoxysilane.

All the solutions prepared under (a) to (c) are highly reactive to moisture and undergo cross-linking to form clear, transparent films which are completely insoluble in dimethylformamide.

EXAMPLE 8 a. The procedure is exactly that described in example 1 but the solvent mixture of toluene and tert. butanol is replaced by dimethylformamide (anhydrous). The procedure is exactly the same as that in example 1 but the monomeric diisocyanate is replaced by 50 parts by weight of 4,4-diisocyanato-diphenylmethane (prepolymer formation at 90°C.) and the chain-lengthening agent used is 16.4 parts by weight of freshly distilled 1-amino-3,3,5-trimethyl-5-aminomethyl-cyclohexane. The NCO:NH$_2$ equivalent ratio = 1.036.

The macrodiisocyanate which contains polyurea groups is reacted at its end groups with 1.98 parts by weight of N-cyclohexyl-(aminomethyl)-triethoxysilane. Average molecular weight approximately 74,000. A solution which is stable on storage is obtained. Its end groups are partly converted into silanol end groups by traces of moisture but this does not cause gelling of the solution because the concentration of the Si-OH groups is too small to bring about subsequent condensation. The further addition of 3.3 parts by weight of N-cyclohexyl-(aminomethyl)-triethoxysilane as chain-lengthening agent results in a 2-component mixture which is rapidly cross-linked in moist air and from which cross-linked foils, films and coatings with excellent strength and abrasion resistance and which may be microporous can be obtained.

b. The procedure is exactly the same as that in (a) and the NCO-groups of the macrodiisocyanate are statistically reacted with only 0.99 parts by weight, i.e., half the quantity, of N-cyclohexyl-(aminomethyl(-triethoxysilane. The solution is left to stand and the remaining NCO-groups then undergo an addition reaction with tert. butanol in the course of 3 days. A stabilized polyurethane-polyurea solution is obtained which reacts relatively slowly in the presence of moisture to give rise to highly branched molecules with comb structures but no cross-linking takes place yet at this stage. The product of the process is then rapidly cross-linked by the further addition of 6 parts by weight of N-cyclohexyl-(aminomethyl)-triethoxysilane as cross-linking agent to give rise to tough and steetchable films and coatings. Elongation at break: 480 percent.

EXAMPLE 9

The procedure is exactly the same as that described in example 1 but 0.047 mol of the N-cyclohexyl-(aminomethyl)-triethoxysilane is replaced by the following aminomethyl-trialkoxy or -dialkoxy derivatives:

(a) C$_6$H$_{11}$—NH—CH$_2$—Si(—OC$_2$H$_5$)$_2$     0.047 mol
                                  |
                                 CH$_3$ (b) C$_6$H$_{11}$—NH—CH$_2$—Si—(O—CH(CH$_3$)$_2$)$_3$     0.047 mol c. C$_2$H$_5$-NH-CH$_2$-Si(-OC$_2$H$_5$)$_3$ 0.047 mol d. C$_2$H$_5$-CH$_2$-NH-CH$_2$-Si(-OC$_2$H$_5$)$_3$ 0.047 mol (e) C$_6$H$_{11}$—NH—CH$_2$—Si—O—tert.—butyl     0.047 mol
                               OC$_2$H$_5$ (above)
                               O—tert.—butyl High reactive polyurethane-polyurea solutions with a concentration of about 20 percent are obtained which undergo quantitative cross-linking in the presence of moisture and have excellent film properties:

a 52 centipoises/21°C.
  b 55 centipoises/21°C.
  c 68 centipoises/21°C.
  d 42 centipoises/21°C.
  e 48 centipoises/21°C.

EXAMPLE 10

This example shows that products of the process differing widely in their structure react with each other to result in linkage at the siloxane groups when hardened by moisture. Thus, for example, polymers which contain polyester-polyurethane-polyurea blocks can be condensed with polymers which contain polyether-polyurethane-polyurea blocks.

100 parts by weight of the reactive polyester-polyurethane-polyurea solution obtained in example 1 are mixed with 100 parts by weight of the solution of reactive polyaddition product described in example 2, i.e., a polyether-polyurethane-polyurea solution. Whereas ordinary polyether- and polyester-polyurethanes or polyureas separate when mixed, the formation of homogeneous films is achieved in this experiment. The films have a high gloss and high strength but are at the time very soft. The aforesaid mixtures are valuable reactants for matrix reactions for the modification of polyurethane foams in accordance with example 6.

EXAMPLE 11 a. The procedure is exactly the same as that described in example 1. an α, ω-macrodiisocyanate which contains polyurea groups is first prepared. The polyaddition product with terminal NCO-groups is converted into α, ω-bis-tert.-butyl urethanes when left to stand for 4 days in a 1:1 solvent mixture of tert. butanol and toluene. % NCO content = 0.00. 12.9 parts by weight of N-cyclohexyl-(aminomethyl)-triethoxysilane are stirred into the solution and the sample is sealed off against atmospheric moisture. The viscosity of the approximately 20 percent solution at 21°C. is 42 centipoises.

When the samples are left to stand, the tert.-butyl-carbamate groups are converted into silyl-substituted ureas with ethoxysilane end groups by a splitting reaction in the course of 14 days, so that when the samples are tested by the cross-linking test with atmospheric moisture in accordance with example 1, 60% of the polyaddition product already undergoes cross-linking. After 3 weeks' storage, the proportion which is capable of cross-linking has increased to 90 percent.

b. In this example, the 1:1 solvent mixture of toluene and tert. butanol is replaced by a 70:30 mixture of xylene and isopropanol and the end groups of the macrodiisocyanates are converted into imidazolyl-urea end groups by reaction with 3.2 parts by weight of imidazole immediately after preparation of the NCO prepolymer. Quantitative replacement of the imidazolyl end groups by N-cyclohexyl-(aminomethyl)-triethoxysilane is already completed after 6 days at 25°C. After this time, the polyaddition product can be cross-linked by traces of moisture.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the preparation of silylsubstituted urea derivatives which comprises
   a. reacting
   1. an organic polyisocyanate of the formula $$Q'(NCO)_{b+1}$$

wherein
Q' represents a (b+1)-valent alkyl radical with 4-12 carbon atoms or a (b+1)-valent $C_4$-$C_{14}$ cycloalkyl, $C_7$-$C_{15}$ aryl-alkyl, $C_1$-$C_{14}$ aryl or $C_8$ alkyl aryl radical, and wherein
b = 1 or 2, with 2. a hydroxyl-containing polyester, polyacetal, polyether, polycarbonate or polythioether at an NCO/H ratio of 1.5 to 1.01, optionally in the presence of a diamine-chain lengthening agent, such that an isocyanate group containing compound having a molecular weight of 4000 to 80,000 and having from 2 to 6 isocyanate groups per molecule is obtained, and b. reacting said isocyanate group containing compound with a compound of the formula

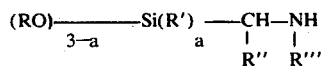

wherein
R represents a $C_1$-$C_{18}$ alkyl or $C_4$-$C_{14}$ cycloalkyl radical, a phenyl or a benzyl radical,
R' represents a $C_1$-$C_{10}$ alkyl, $C_4$-$C_{10}$ cycloalkyl or $C_6$-$C_{10}$ aryl radical or halogenated or cyanosubstituted derivatives of each,
R" represents a hydrogen atom or a methyl or phenyl radical,
R''' represents a hydrogen atom or a $C_1$-$C_{18}$ alkyl, $C_4$-$C_{14}$ cycloalkyl or $C_6$-$C_{14}$ aryl radical or halogenated or cyano-substituted derivatives of each, and
a = 0, 1 or 2, at a temperature of between −20°C. and 150°C in the presence of 10 to 80 percent by weight based on the total quantity of reactants of a secondary or tertiary alcohol.

2. A product produced by the process of claim 1.

* * * * *